(12) United States Patent
Harper et al.

(10) Patent No.: US 7,320,584 B1
(45) Date of Patent: Jan. 22, 2008

(54) DIE SET HAVING SEALED COMPLIANT MEMBER

(75) Inventors: Bruce M. Harper, San Jose, CA (US); Christopher H. Bajorek, Los Gatos, CA (US)

(73) Assignee: Komag, Inc., San Jose, CA (US)

( * ) Notice: Subject to any disclaimer, the term of this patent is extended or adjusted under 35 U.S.C. 154(b) by 329 days.

(21) Appl. No.: 10/886,898

(22) Filed: Jul. 7, 2004

(51) Int. Cl.
*B28B 11/08* (2006.01)

(52) U.S. Cl. .................. 425/390; 425/389; 425/405.1; 425/411; 425/444; 101/16

(58) Field of Classification Search ................ 425/389, 425/390, 405.1, 411, 444; 101/16; 29/428; 264/2.7, 219; 997/887, 888
See application file for complete search history.

(56) References Cited

U.S. PATENT DOCUMENTS

| | | | | |
|---|---|---|---|---|
| 4,266,921 A | * | 5/1981 | Murray | 425/158 |
| 5,213,600 A | | 5/1993 | Greschner et al. | |
| 5,786,003 A | * | 7/1998 | Debbia | 425/405.1 |
| 6,030,576 A | * | 2/2000 | Cassani | 264/570 |
| 6,165,391 A | | 12/2000 | Vedamuttu | |
| 6,482,742 B1 | | 11/2002 | Chou | |
| 2002/0000518 A1 | * | 1/2002 | Oudshoorn et al. | 250/454.11 |

FOREIGN PATENT DOCUMENTS

WO    WO 03/090985    11/2003

* cited by examiner

*Primary Examiner*—Yogendra N. Gupta
*Assistant Examiner*—Maria Veronica Ewald
(74) *Attorney, Agent, or Firm*—Blakely, Sokoloff, Taylor & Zafman LLP

(57) ABSTRACT

A press system that reduces contamination of workpieces and/or compliant members used in die assemblies of the press from the pressing process. The die assemblies may utilize annular or hole-less stampers in which the compliant member is sealed in the die assembly. The compliant member may have be annular having a cavity at approximately its center. A gap may be generated at the cavity of the compliant member between a constraint member and the stamper. The gap, for example, may be filled with a plug to prevent significant distortion of the stamper over a hole of a disk shaped workpiece due to the pressure induced force generated by the press system. An outer diameter ring surrounding a workpiece may be used to prevent collapse of the stampers outside the diameter of the workpiece to insure uniform pressing out to the outer diameter of the workpiece.

43 Claims, 10 Drawing Sheets

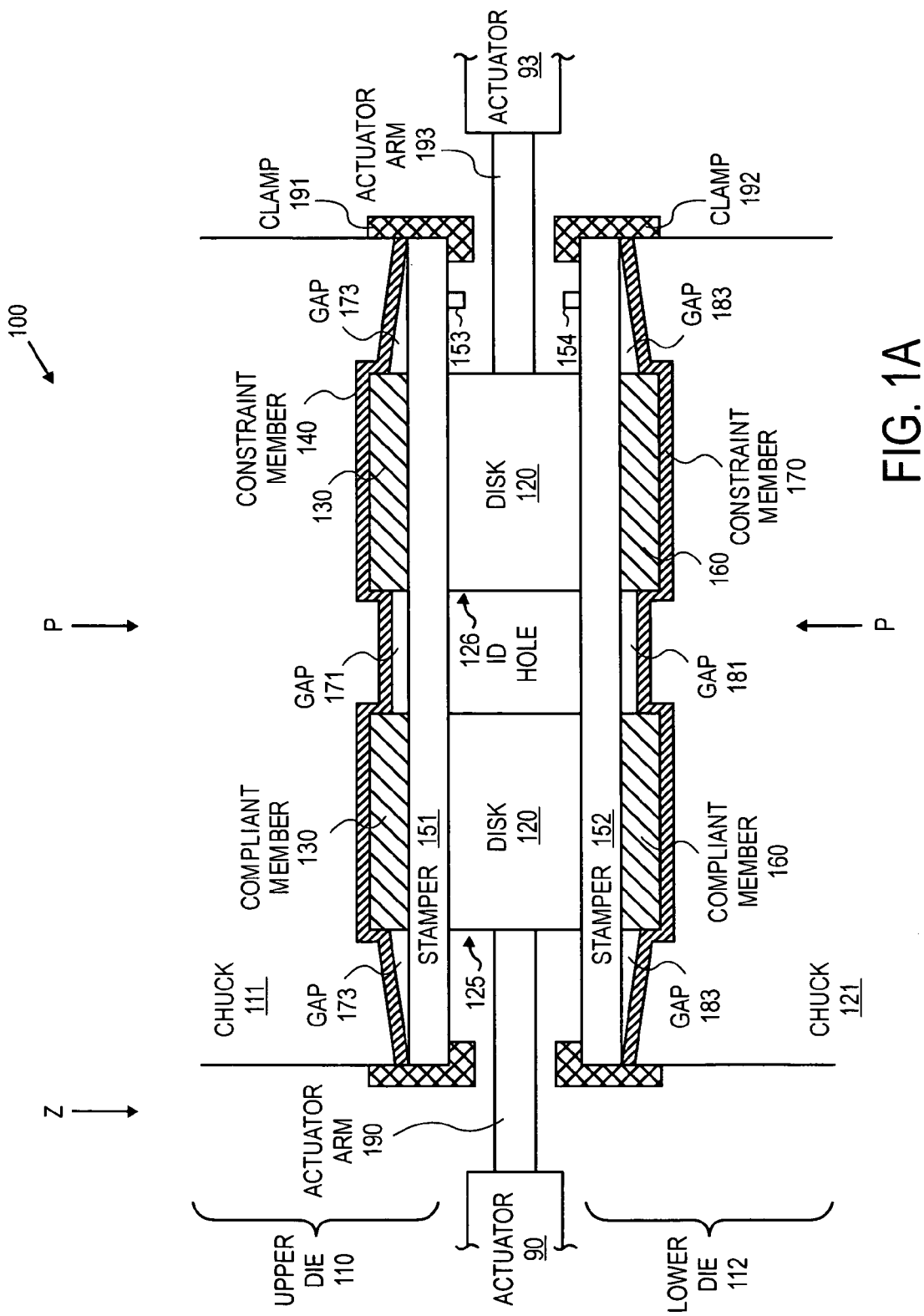

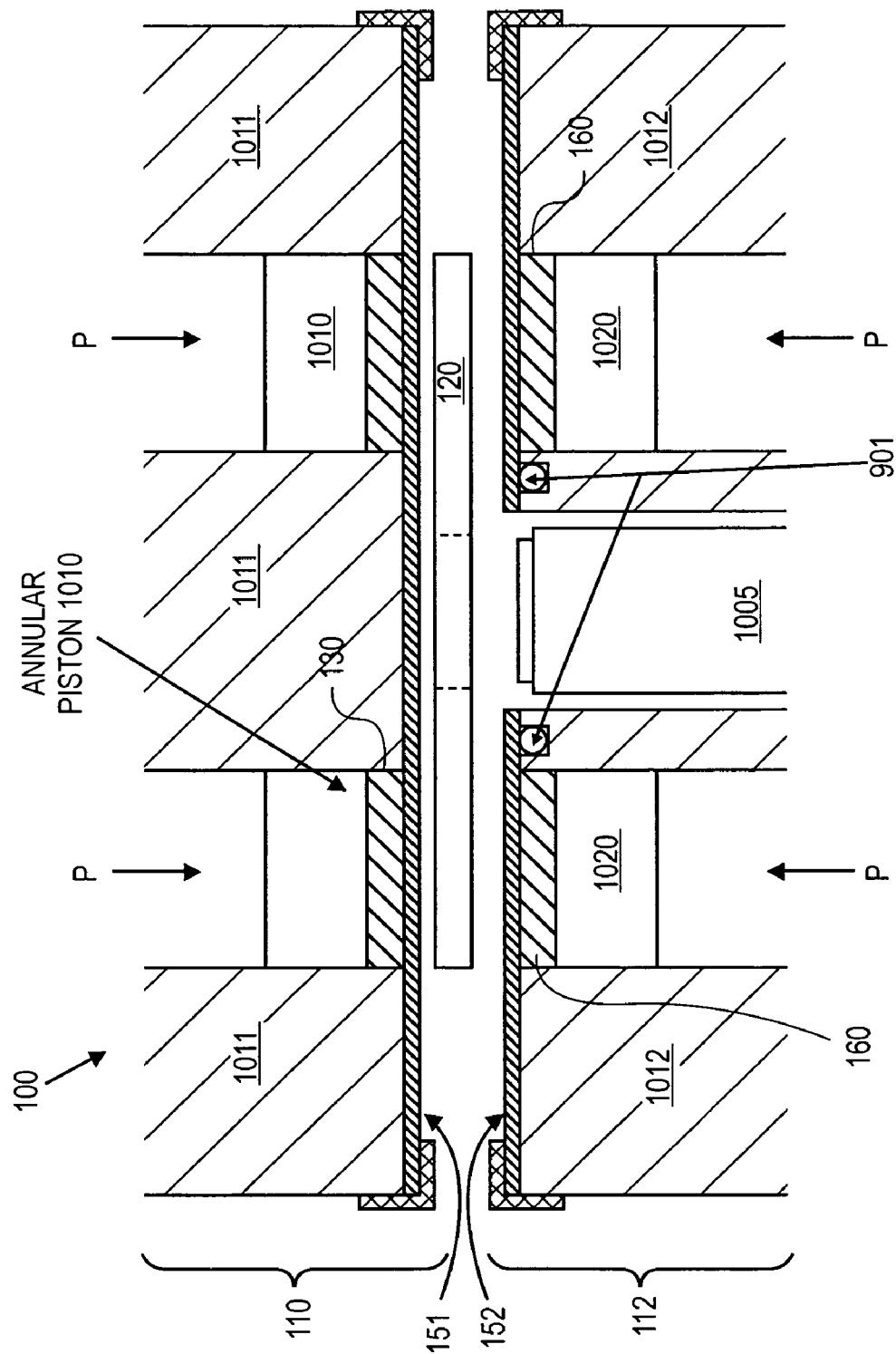

DIE SET HAVING SEALED COMPLIANT MEMBER

TECHNICAL FIELD

This invention relates to the field of manufacturing, and more specifically, to press systems.

BACKGROUND

A disk drive system typically has one or more magnetic recording disks and control mechanisms for storing data within approximately circular tracks on a disk. The magnetic recording disk is composed of a substrate and one or more layers deposited on the substrate. A disk substrate may be produced from a blank sheet of, for example, a metal-based material such as aluminum or aluminum magnesium. The sheet may be punched to generate a disk substrate having an inner diameter (ID) and an outer diameter (OD). After removing the ID and OD, the disk-shaped substrate may be further processed (e.g., polished, textured, layer deposition, etc.) to produce the magnetic recording disk.

The trend in the design of magnetic hard disk drives is to increase the recording density of a disk drive system. Recording density is a measure of the amount of data that may be stored in a given area of disk. One method for increasing recording densities is to pattern the surface of the disk to form discrete tracks, referred to as discrete track recording (DTR). DTR disks typically have a series of concentric raised zones (a.k.a., lands, elevations, etc.) storing data and recessed zones (a.k.a., troughs, valleys, grooves, etc.) that may store servo information. The recessed zones separate the raised zones to inhibit or prevent the unintended storage of data in the raised zones.

One method of producing DTR magnetic recoding disks is through the use of a press to imprint embossable films residing on one or both sides of a disk substrate. The press utilizes a die for each side of the disk to be imprinted. The die includes a stamper that is pressed into the embossable film to form the imprinted pattern in the film. The pattern is subsequently transferred to the substrate and/or one or more layers residing above the substrate. Thin film magnetic recording layers are then sputtered over the patterned surface of the substrate to produce the DTR media having a continuous magnetic layer extending over both the raised zones and the recessed zones.

Conventional presses utilize multiple post precision die sets to attain alignment of the upper and lower dies used to imprint the embossable films on each side of the disk substrate. One problem with conventional presses is that they require specialized press alignment methods involving the use of a mandrel, or shaft, in the upper die. The mandrel is disposed near the middle portion of the upper die and has a tapered nose oriented to face the lower die. The mandrel has a diameter sized to engage the ID of the disk. The lower die has a cylindrical opening sized to receive the tapered nose of mandrel. The upper and lower dies also contain membrane or elastomer backed stampers that are used to imprint the embossable films. The stampers are disposed around the mandrel and, thus, have an annular shape with an inner diameter (i.e., a hole, or cavity, at their centers). The membranes or elastomers provide for compliance or parallelism between the embossable films and the stamper's patterned surface during pressing. One problem with this type of press system configuration is that the contact between the components (e.g., disk, stamper, mandrel, etc.) causes unwanted particulates (e.g., dust and other impurities) to accumulate around or in the components. Contamination of the press system has detrimental effects, including the decay of the membranes and elastomers, and also the damage to the stampers and imprinted disks. In addition, with such a press system, when a particular die portion becomes contaminated, the entire press system or die assembly needs to be shut down in order to service the contaminated die portion. This causes idling of the press system that slows manufacturing cycle times.

Another problem with conventional presses is that they require very robust clamping structures to hold a stamper immobile in a die under high stamping forces. Such clamping structures may be incompatible with the clearances required, for example, for DTR imprinting operations. A stamper used for DTR imprinting operations may need to be unyieldingly held about a central axis, in a flat plane, in order to accurately imprint disks. However, since the two opposing stampers in a press are typically separated by only the thickness of a disk (e.g., 1300 microns or less), there is little room for the sort of robust clamping apparatus need to hold a stamper immobile in a die under high stamping forces.

BRIEF DESCRIPTION OF THE DRAWINGS

The present invention is illustrated by way of example, and not limitation, in the figures of the accompanying drawings in which:

FIG. 1A is a cross section illustrating one embodiment of components of a press system.

FIG. 10 is a cross section illustrating yet another embodiment of a press system.

DETAILED DESCRIPTION

Figure 1B:
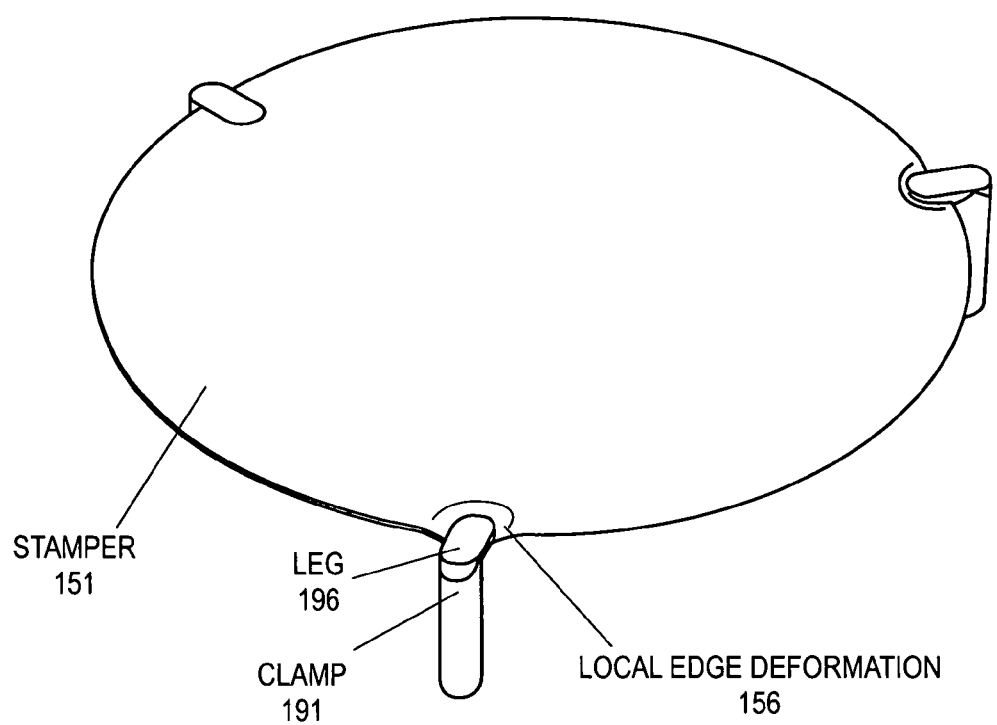
FIG. 1B illustrates one embodiment of clamping a stamper to a die piece such as a chuck.

In the following description, numerous specific details are set forth such as examples of specific, components, processes, etc. in order to provide a thorough understanding of various embodiment of the present invention. It will be apparent, however, to one skilled in the art that these specific details need not be employed to practice various embodiments of the present invention. In other instances, well known components or methods have not been described in detail in order to avoid unnecessarily obscuring various embodiments of the present invention.

It should be noted that the apparatus and methods discussed herein may be used with various types of disks. In one embodiment, for example, the apparatus and methods discusses herein may be used with a magnetic recording disk. Alternatively, the apparatus and methods discussed herein may be used with other types of digital recording disks, for example, a compact disk (CD), a digital versatile disk (DVD), and a magneto-optical disk.

Various methods and apparatus are discussed herein for press systems that reduce contamination of workpieces and/or compliant members from the pressing process (e.g., die components, stampers, centering elements). In one embodiment, for example, hole-less stampers are used in upper and lower dies of the press. A compliant member is sealed in a die assembly between the hole-less stamper and a constraint member. In one embodiment, the compliant member may have a cavity at approximately its center. A gap may reside at the cavity of the compliant member between the constraint member and the stamper. The gap, for example, may be filled with a plug or pressurized gas to prevent significant distortion of the stamper over the disk ID hole due to the pressure-induced force generated by the press system. In one embodiment, a support ring surrounding outer diameter of the disk may be used to prevent collapse of the stamper outside or past the OD of the disk and insure uniform pressing at least out to the outer diameter of the workpiece (e.g., an embossable film disposed over a disk substrate).

Embodiments of the present invention prevent or minimize particulate accumulation/contamination to the press system during its operation by factors such as rubbing parts (e.g., disk, stamper, mandrel, etc.) that may result in the decay of parts such as compliant members and stampers and also may cause defects in workpieces. Such contamination reduction may be achieved while also providing for the alignment of dies (e.g., upper and lower die portions) with respect to each other and the disk, no contact between critical surfaces until die clamping, and/or the ability to service die assemblies off-line. The use of a hole-less stamper may also reduce disk and/or compliant member contamination during the pressing process while also facilitating the handling and mounting of a stamper in a die. Embodiments of the stampers and compliant members discussed herein may also facilitate proper imprinting at the outer most edge of a disk. This is important, for example, where disk 120 is a magnetic recording disk. In order to increase the storage capacity of such a disk, the ID region of the disk is used for a landing (CSS or ramp/load) zone, thereby leaving the greater outer diameter areas of the disk available for data storage (which therefore requires uniform pattern imprinting at the OD edge).

FIG. 1A is a cross section illustrating one embodiment of components of a press system. Press system 100 shows a disk 120 disposed between an upper die 110 and a lower die 112 of the press. Disk 120 is comprised of an embossable film disposed over one or both sides of a base structure that has not been illustrated so as not to obscure an understanding of embodiments of the present invention. In such an embodiment, dimensions of disk 120 and stampers 151 and 152 discussed below may be referred to as diameters (e.g., inner diameter, outer diameter). Although the embodiments of the invention may be discussed in relation to a disk for ease of explanation, the invention is not so limited. In alternative embodiments, disk 120 may be another type of workpiece and have other non-disk shaped dimensions (e.g., square, rectangular, etc.). Furthermore, the stampers discussed herein may be oversized and/or different shaped relative to the size and shape of the disk to be pressed. In alternative embodiments, the stamper may have other shapes and other corresponding dimensions (e.g., widths and lengths).

Press system 100 includes an upper die 110 and a lower die 112. The upper die assembly 110 includes chuck 111, constraint member 140, compliant member 130, stamper 151, and one or more clamps (e.g., clamp 191). Clamp 191 is used to secure the constraint member 140, compliant member 130, and stamper 151 to the chuck 111. Similarly, lower die assembly 112 includes chuck 121, constraint member 170, compliant member 160, stamper 152, and clamp 192. Clamp 192 is used to secure the constraint member 170, compliant member 160, and stamper 152 to the chuck 121. One or both of chucks 111 and 121 are movable to align stampers 151 and 152 relative to each other, as discussed below. Where stampers 151 and 152 are of a certain thickness such that they are ductile, the particular clamping method discussed in relation to FIG. 1B, in one embodiment, may be used.

FIG. 1B illustrates one embodiment of clamping a stamper to a die piece such as a chuck. In this embodiment, stampers 151 and 152 are constructed of a certain material and have a certain thickness such that it is ductile. For example, stampers 151 and 152, when constructed from nickel (Ni) and having a thickness approximately in the range of 300 microns or less, are quite ductile, such that a small amount of land at the perimeter of the stampers can be easily bent downward, under controlled conditions, without distorting the inwardly located stamping features (not shown). Such a local edge deformations (e.g., deformation 156 illustrated in FIG. 1B) provides ample area for the clamps (e.g., clamp 191 in the embodiment of FIG. 1B) to pinch stamper 151 against a receiving feature in the die 110. Since the area of the local edge deformations (e.g., deformation 156) has a depth being lower than the press (e.g., imprinting) surface and the clamp legs (e.g., leg 196) are thinner than the amount of deformation of the stamper, two similarly constructed opposing stampers 151, 152 are able to press a disk without the clamps (e.g., clamp 191 in the embodiment of FIG. 1B) interfering with each other. In one exemplary embodiment, the legs and clamps may be constructed from tool steel. Alternatively, other materials may be used. In an alternative embodiment, other ductile materials may be used for stampers 151 and 152.

Figure 1C:
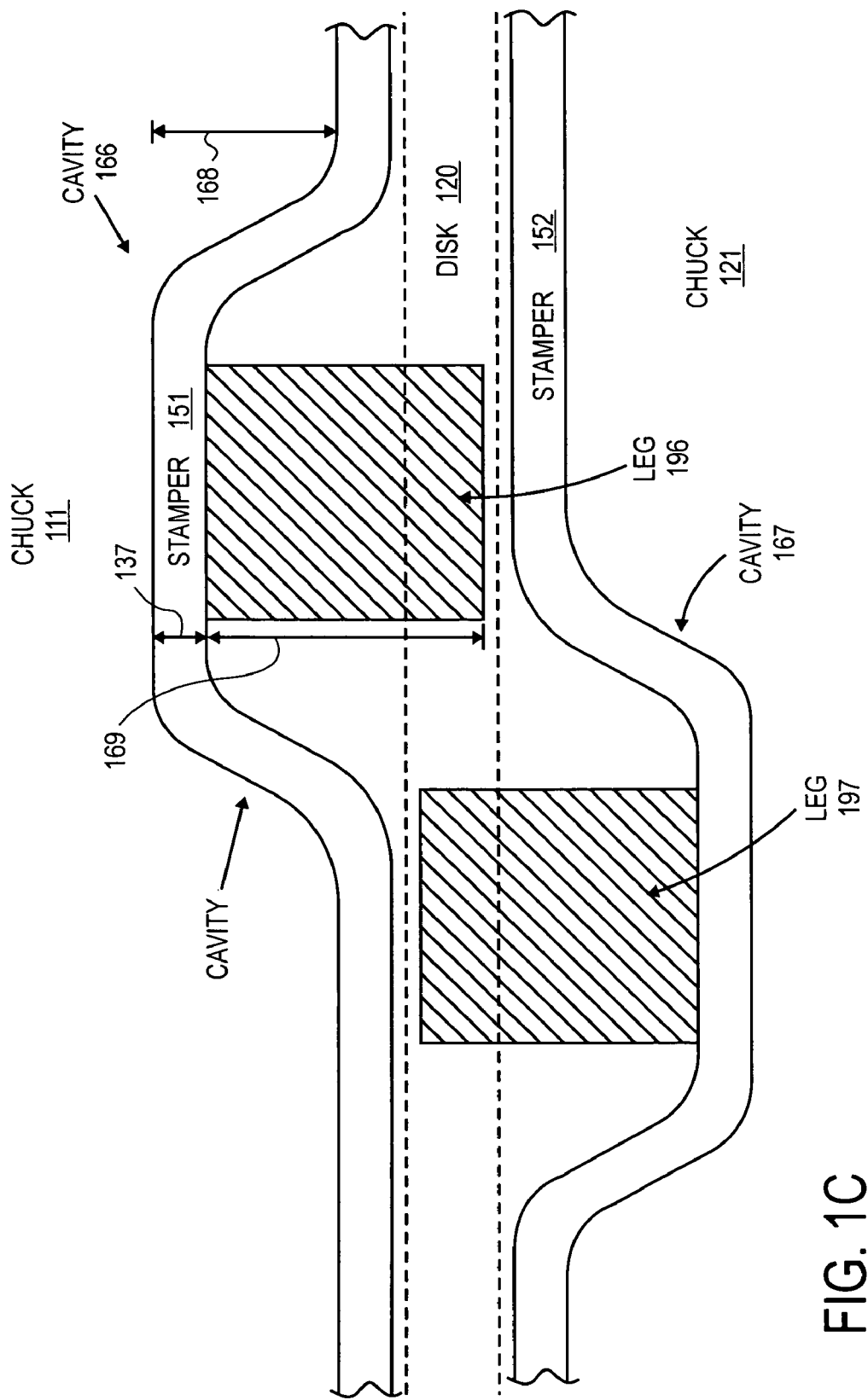
FIG. 1C is a cross-sectional view illustrating a region of one embodiment of the press system near the OD edge of the chucks and stampers.

FIG. 1C is a cross-sectional view illustrating a region of one embodiment of the press system near the OD edge of the chucks and stampers. In this embodiment, the chucks 111 and 121 include cavities (e.g., cavities 166 and 167) to accommodate clamp legs (e.g., legs 196 and 197, respectively) being thicker than the stampers 151 and 152, when the chucks are in a closed position. In such an embodiment, the thickness of the clamp legs (e.g., legs 196 and 197) is greater than the thickness of stamper 151. The thicker the clamps, the better the clamps may operate to maximize clamping force. In this embodiment, the clamp thickness 169 plus the distorted stamper 151 thickness 137, plus the cavity depth 168 under the clamped stamper 151 should not exceed the space to stamper 152. To maximize clamp thickness, the locations of the chuck 111 clamp legs (e.g., leg 196) relative to the chuck 121 clamp legs (e.g., leg 197) may be offset annularly relatively to each other to avoid lower to upper chuck clamp leg interface. In an exemplary embodiment, stampers 151 and 152 may each have a thickness of approximately 300 μm, disk 120 may have a thickness of approximately 500 μm, and chuck cavities (e.g., cavity 168) may have a depth of approximately 1000 μm. In one exemplary embodiment, the clamps may have a thickness approximately in the range 1200 µm to 6,350 µm. Such dimensions are only exemplary and other dimensions may be used. In an alternative embodiment, the thickness of the clamp legs (e.g., leg 196) may be thinner than the thickness of stamper 151.

Referring again to FIG. 1A, in one embodiment, the compliant members 130 and 160 may have outer diameters approximately the same as the outer diameter 125 of disk 120 and inner diameters approximately the same as the inner diameter 126 of disk 120. Alternatively, compliant members 130 and 160 may have dimensions greater than or less than the dimension of disk 120. For example, the annular dimensions of the compliant members 130 and 160 need not match the annular dimensions of disk 120. For example, the annular dimensions of complaint members 130 and 160 may only extend out to a chamfer edge of disk 120 and/or a clamping zone of disk 120, as further discussed below in relation to FIG. 9.

It should also be noted that the compliant members 130 and 160 need not completely cover stampers 151 and 152. For example, in one embodiment, the compliant members 130 and 160 may be in contact with a portion of the stampers having an imprinting structure to be imprinted into an embossable film of disk 120. In such an embodiment, the compliant members 130 and 160 may have annular diameters that approximately correspond to the intended data surfaces of a disk being a DTR magnetic recording disk.

Compliant members 130 and 160 are constrained by constraint members 140 and 170, respectively. Constraint members 140 and 170 are disposed along the entire diameter (or length, width, etc.) of stampers 151 and 152, respectively, so that compliant members 130 and 160 do not out flow (i.e., does not displace outwardly when pressed against stampers 151 and 152). Constraint members 140 and 170 are constructed of a solid material that transfers pressure (P) applied by thrust mechanisms of press 100 to each of upper die 110 and lower die 112. Constraint members 140 and 170 are constructed of a solid material that is difficult to distort, for example, steel. Alternatively, other solid materials may be used for constraint members 140 and 170. In order to transfer pressure to stampers 151 and provide space for compliant member to deform, gaps are constructed between compliant member 130 and stamper 151 in areas over the stamper not covered by compliant member 130. In particular, an inner gap 171 is formed between the inner diameter cavity of compliant member 130 and an outer gap 173 is formed outside the outer diameter of compliant member 130. Similarly, an inner gap 181 is formed between the inner diameter cavity of compliant member 160 and an outer gap 183 is formed outside the outer diameter of compliant member 160.

Compliant members 130 and 160 should preferably be easy to distort under low to moderate pressure, for example, elastic polymer or rubber. In one particular embodiment, the compliant members 130 and 160 may be composed of a silicon elastomer, for example, Sylgard 184™ available from Dow Corning Corporation of Michigan. In one embodiment, compliant members 130 and 160 may each have a thickness approximately equal to or greater than the thickness of stampers 151 and 152. For example, the thickness of stampers 151 and 152 may be approximately in the range of 1 to 300 microns and the thickness compliant members 130 and 160 may be approximately in the range of 10 microns to 5 millimeters. The use of compliant members 130 and 160 with a thickness equal to or greater than the thickness of stampers 151 and 152 may assure a more uniform pressure distribution and good compliance during, for example, imprinting of an embossable film of disk 120.

It should be noted that although compliant members 130 and 160 may be discussed, at times, in relation to an elastomer, other types of compressible materials may be used. In an alternative embodiment, other types of compliant materials may be used, for example, urethanes and graphites. The particular material selected for use as compliant members 130 and 160 may be based on various factors including but not limited to, for example, its thermal resistance, hardness, and resilience to repeated pressure events.

Alternatively, one or both of compliant members 130 and 160 may be membranes providing sufficient compliance. The membranes may be constructed from flexible, elastic materials that are hermetically sealed to a die assembly such that a fluid pressure can be applied to their back surface (surface opposite that contacting the stamper) to press the flexible membrane against a stamper, as discussed in further detail below. In one embodiment, a membrane may have a thickness approximately in the range of 10-300 microns. Alternatively, a membrane having other thickness may be used. In one embodiment, a membrane may be constructed from a metal (e.g., Ni) or metal alloy (e.g., steel and beryllium copper) material. Alternatively, other materials may be used for a membrane, for example, glass and ceramic. In yet another embodiment, compliant members 130 and 160 may be constructed from a composite of materials, for example, a polymer layer disposed on a metal (e.g., aluminum) backing plate.

In one embodiment, stampers 151 and 152 may be constructed of a relatively hard material that may also be rigid, for example, Ni. Alternatively, other hard materials may also be used for the stampers 151 and 152, for example, glass and ceramic. It should be noted that the patterned features of stampers 151 and 152 have not been illustrated so as not to obscure an understanding of embodiments of the invention.

In one embodiment, disk 120 may be aligned using multiple actuators. Although two actuators 90 and 93 are illustrated in FIG. 1A, additional actuators may be used. The combination of actuators forms a multiple jaw chuck to engage the OD of a disk 120. A transport mechanism such as a robot arm (not illustrated) may be used to transport disk 120 between dies 110 and 112. Actuators 90 and 93 may then be activated to have actuator arms (e.g., a rods) 190 and 193 engage the outer sides of disk 120 and, thereby, avoid potentially damaging contact with the to-be-pressed surfaces of disk 120. Actuators 90 and 93 may be coupled to Z motion (i.e., top to bottom of FIG. 1A) motors (e.g., servo and stepper motors) that move the actuators and, thereby, disk 120 into and out of close proximity with the surfaces of the dies (e.g., lower die 112). The actuators 90 and 93 may be used to center the disk 120 relative to the dies 110 and 112 via linear control of actuator arms 190 and 193. The centering of disk 120 relative to stampers 151 and 152 may be done in real-time in which a known reference point on at least one of the stampers is checked against a known reference point on the disk 120. Adjustments to the disk substrate may be dictated by an actuator controller (not shown) coupled to the actuators 90 and 91. When disk 120 is aligned, upper and lower dies 110 and 112 are then closed for the pressing operation. Actuator arms 90 and 91 are constructed from a material and have dimensions (e.g., diameter and length) that allow for the arms (e.g., rods) to flex when, for example, the upper die 110 is raised from the illustrated closed position in FIG. 1A to an open position.

It should be noted that actuators 90 and 91 represent one of several mechanisms for achieving nano actuation. Actuators 90 and 91 may be, for example, piezo actuators. Alternatively, other types of actuators may be used, for example, voice coil actuators. Actuators and robotic arms are known in the art; accordingly, a more detailed discussion is not provided.

Figure 2:
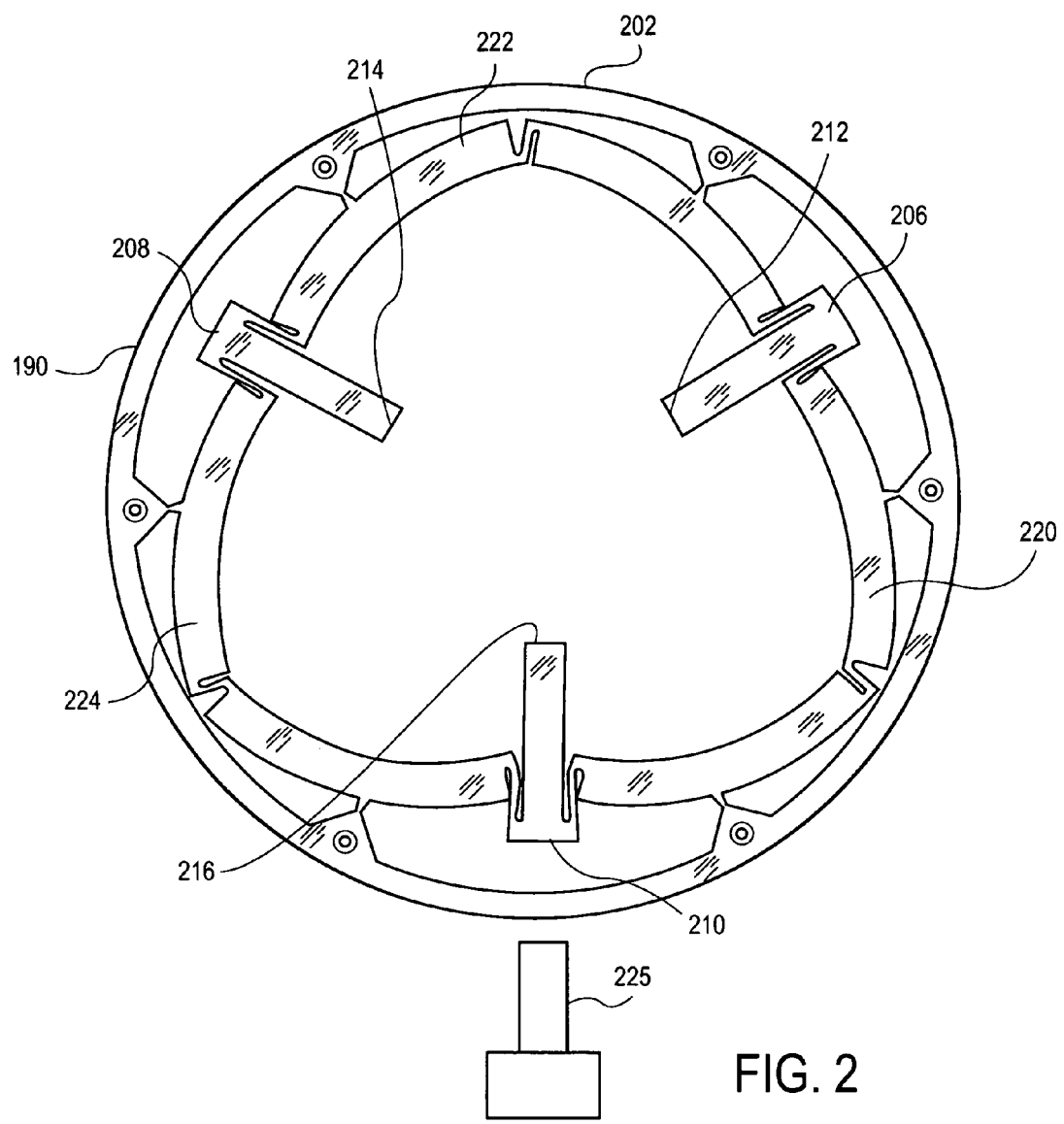
FIG. 2 illustrates one embodiment of a disk alignment mechanism.

FIG. 2 illustrates an alternative embodiment of a disk alignment mechanism for disk 120. Disk 120 is secured during transport to/from dies 110, 112 and aligned by, for example, an actuator arm 190 such as that illustrated in FIG. 2. Actuator arm 190 has an outer ring that includes a series of joints 220, 222, and 244 that connect fingers 212, 214, and 216. Each of the fingers has extensions 212, 214, and 216 that are configured to make contact with the outer diameter side of the disk 120 (as illustrated in FIG. 1A). Each of the joints is flexible to allow the fingers to expand outward or pivot to provide clearance for receiving disk 120 within the fingers and then contracts or pivots again to engage disk 120.

In one embodiment, a single thrusting actuator 225 may be used to contact one of backs 206, 208, 210 of fingers 212, 214, and 216, respectively. The thrusting actuator 225 may enter through a bracket (not shown) and apply a force first towards finger 216 that, in turn, applies a force to fingers 208 and 210. This causes all the fingers 212, 214, and 216 to clamp disk 120 at approximately the same time and in approximately the same position repeatedly. A single thrusting actuator provides the advantage of being able to capture a disk in approximately the same position each time. In one embodiment, thrusting actuator 225 may be, for example, a piezo-actuator. Alternatively, other types of actuators known in the art may be used. Alternatively, other types of infeed/outfeed mechanisms known in the art may be used, for example, an infeed/outfeed mechanism that engages a disk at its inner diameter sides.

During the infeed of disk 120 between dies 110 and 112, disk 120 is suspended above lower die 112 using arm 190. The actuator arm 190 may be made of a material having dimensions that enable actuator arm 190 to flex when the upper and lower dies 110 and 112 are closed or pressed against each other. Alternatively, the actuator arm 190 may already be flexed during transport and unflexed when upper and lower dies 110 and 112 are closed or pressed.

Figure 3:
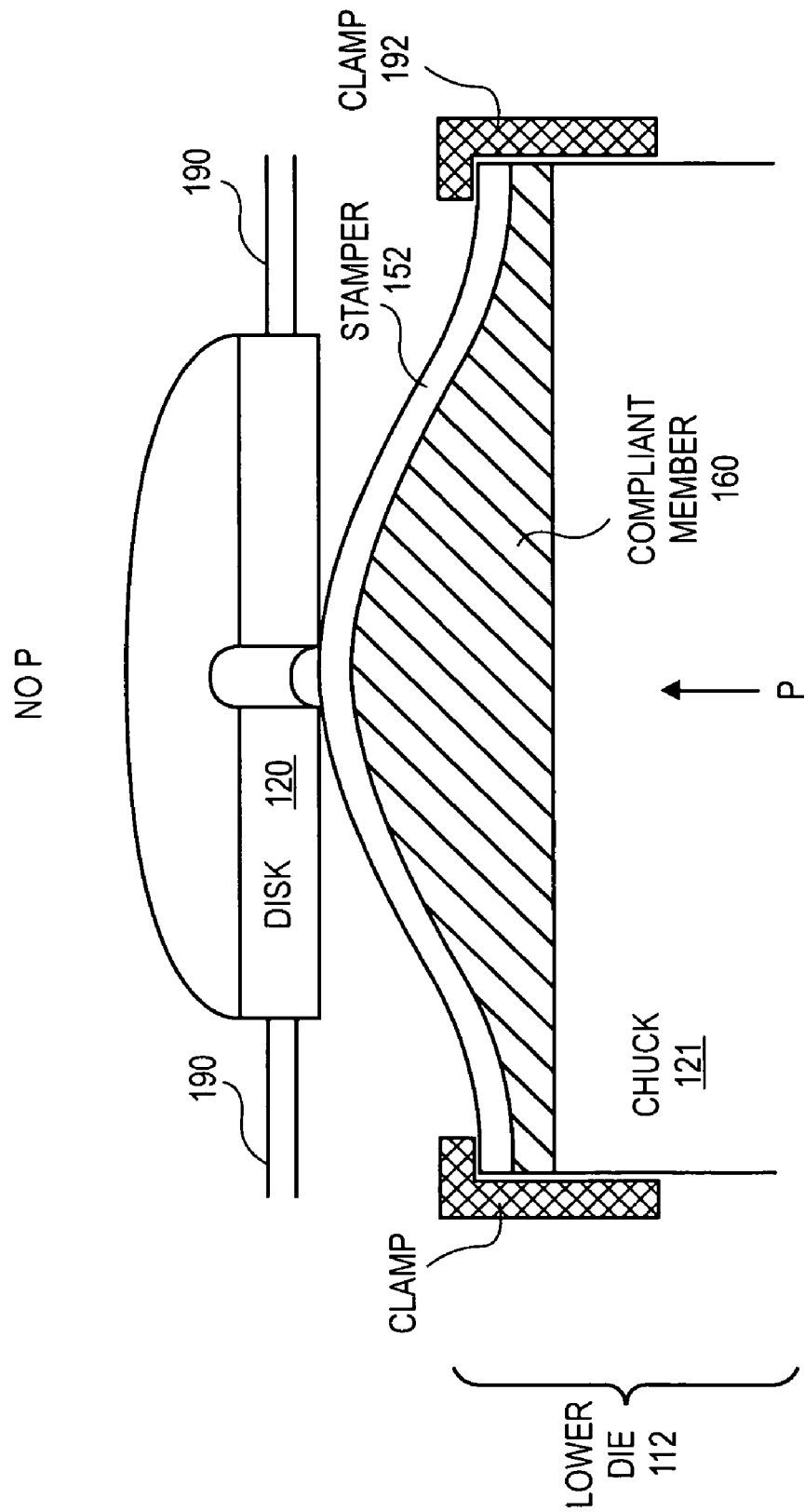
FIG. 3 illustrates one embodiment of a die having a bowed elastomer.
Figure 4:
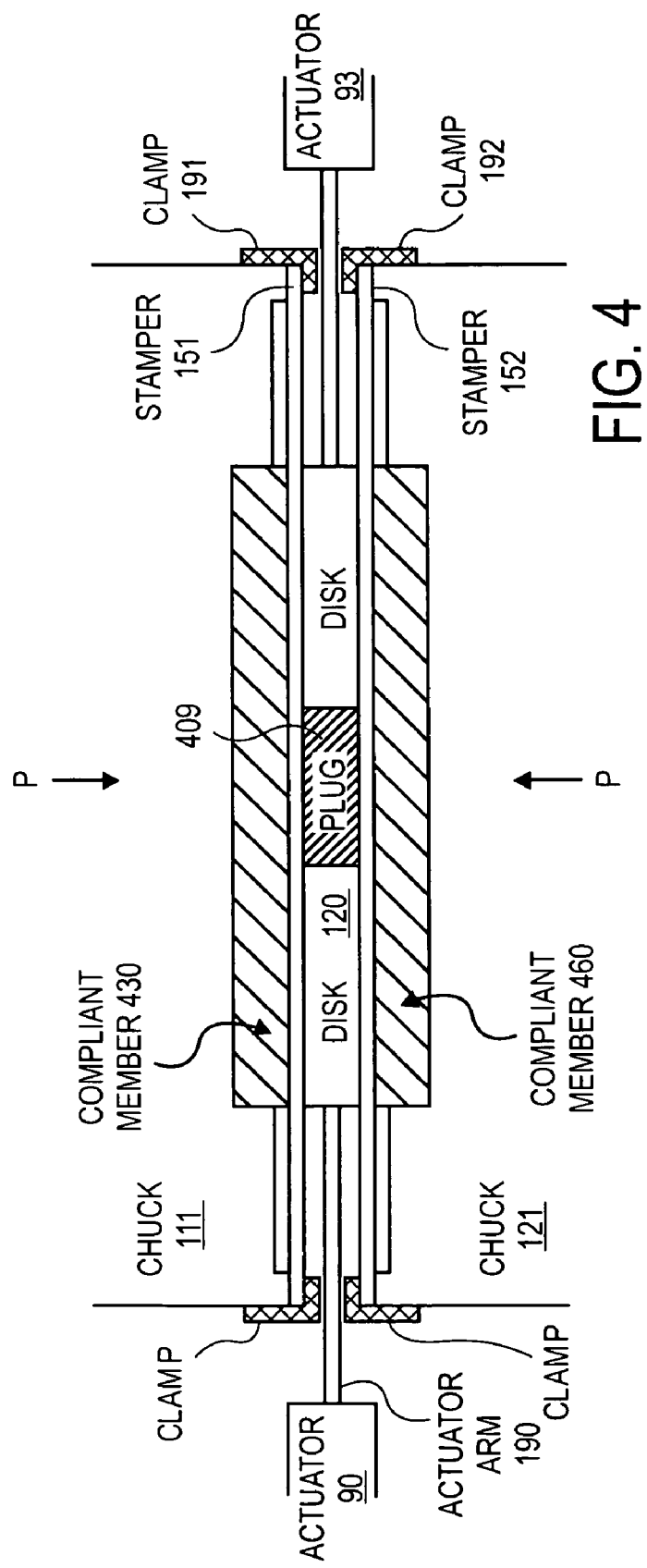
FIG. 4 is a cross section illustrating an alternative embodiment of a press system utilizing an inner plug.

In one embodiment, upon opening of upper and lower dies 110 and 112 (i.e., releasing of pressing pressure), the compliant member 160 of the lower die assembly 112 may be configured to expand, or bow, in order to raise the disk 120 above the lower die 112. The complaint member 160 when constructed from certain materials such as an elastomer may bow outwardly (i.e., against the disk), as illustrated in FIG. 3, upon the release of pressure applied to it. In one embodiment, the compliant member 160 maintains contact with disk 120 while bowing in the central area of disk 120 that may be a non-critical area of the disk, for example, where disk 120 has chamfer edges and/or a clamping zone, so as to prevent damage to the patterned disk areas.

Alternatively, the compliant member 160 may be biased to a pre-bowed position and returned to such a pre-bowed shape upon release of pressure. When in the raised position illustrated in FIG. 3, actuator arm 190 may be used to secure disk 120 at its outer diameter side and remove disk 120 from the die pressing area. The bowing of the compliant member 160 may also facilitate the separation of stamper 152 and disk 120 after pressing. The bowing of compliant member 160 may also facilitate driving of air from the stamper-disk interface during pressing. It should be noted that in an alternative embodiment, a plug within the inner diameter hole of disk 120 and/or an outer diameter ring (not illustrated in FIG. 3) may be used with the press system, as discussed below and illustrated in relation to FIGS. 4-8.

Referring again to FIG. 1A, in one embodiment, alignment of the stampers 151, 152 relative to each other and/or disk 120 may be required prior to pressing. For example, where disk 120 represents a DTR magnetic recording disk, such a disk may not be viable if the imprinting surfaces of the stampers are not concentrically aligned with the center of the disk substrate. This requirement may be particularly important when data tracks are generated on both sides of disk 120 because the data tracks on each side need to be in co-axial alignment with each other. As such, the imprinting of an embossable film above a disk substrate requires an alignment of the stampers 151, 152 relative to each other as well as to disk 120. In such an embodiment, one or both of chucks 111 and 121 are movable to pre-align stampers 151 and 152 relative to each other.

In one embodiment, for example, optical alignment techniques may be used in which a sensor (e.g., optical, not shown) is directed toward alignment targets or marks, 153 and 154 disposed on stampers 151 and 152, respectively. The sensor may be used to confirm when the proper amount of alignment motion of one or both of chucks 111 and 121 has been achieved. Such an inspection may be done on a real-time or sampling basis. Then actuator arm 190 may be used to align disk 120 relative to stampers 151 and 152. Alignment of the disk 120 relative to stampers 151 and 152 may also be performed on a real-time or sampling basis. For example, the disk 120 may be retracted from the press 100 and positioned to a known reference point directly below a microscope or an optical device (e.g., camera). The pattern(s) printed on the embossable layer of disk 120 is then examined. If it is found that the imprinted pattern(s) is offset or not properly aligned, instructions may be forwarded to the actuator arm 190 to adjust the position of disk 120 between stampers 151, 152 to the proper position. Alternatively, other alignment mechanisms may be used to align stampers 151 and 152 with respect to each other and enable disk 120 to be aligned properly between stampers 151 and 152.

The press system 100 discussed above with respect to FIGS. 1-3 enables the pressing of disk 120 with minimal or no contact between critical surfaces until die clamping and/or provides the ability to service the upper and lower die assemblies off-line. More specifically, the upper and lower dies 110 and 112 are detachably coupled in the press system 100 such that they can be removed, for example, to service (e.g., replace) components such as stampers and compliant members.

FIGS. 4-8 are cross sections illustrating alternative embodiments of a press system having hole-less stampers 151, 152 and compliant members 430, 460 such that the compliant members and stampers are continuous over their entire diameters. The actuator arms 190 and 191 have been omitted in FIGS. 6-8 for clarity. In such embodiments, the inner diameter hole of disk 120 may be filled with a plug 409 in order to inhibit collapse of stampers 151 and 152 into the inner diameter hole. In one embodiment, plug 409 is constructed from a solid material, preferably a solid material that is difficult to distort (e.g., NIP clad aluminum, glass). In an alternative embodiment, plug 409 may be constructed from a compliant material e.g., a hard elastomer or a material similar to that used for compliant members 430 and 460. Alternatively, plug 409 may be substituted with a gas pressure as previously discussed with respect to FIG. 1A.

Figure 5:
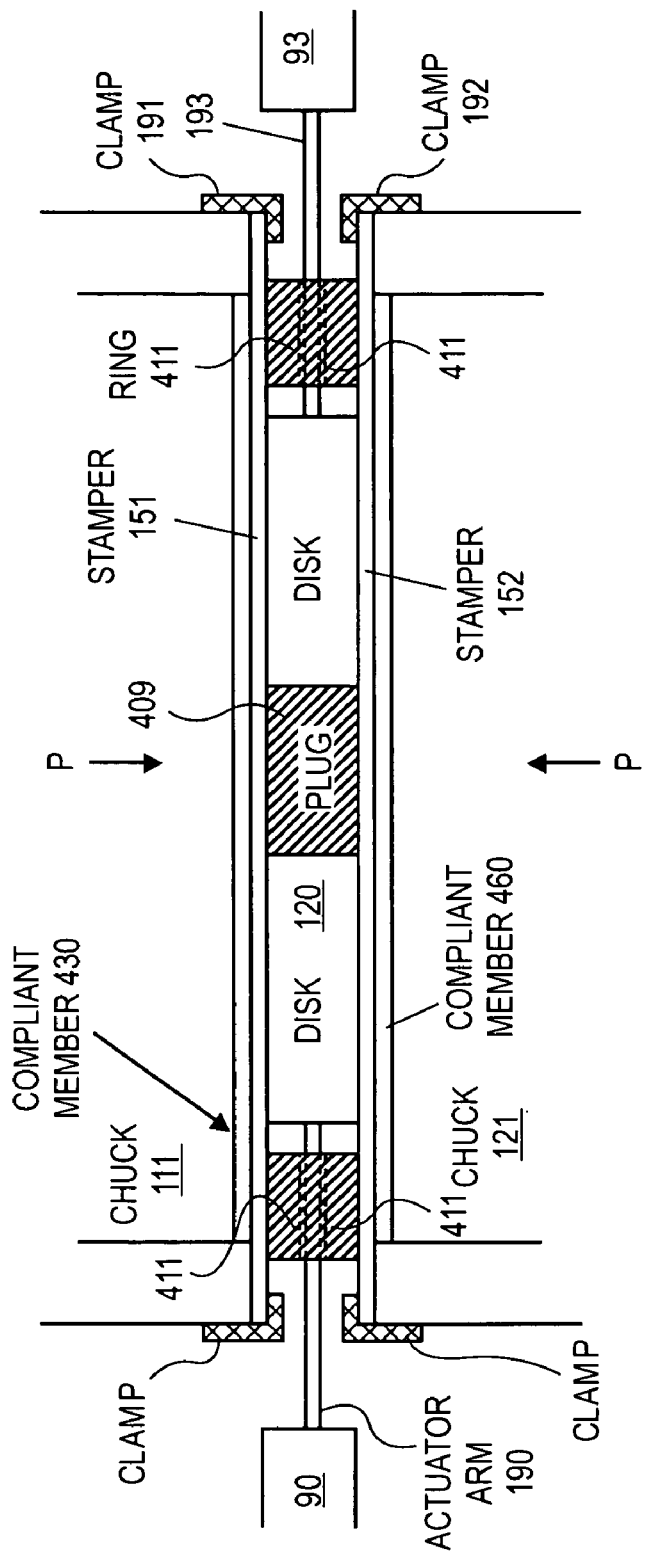
FIG. 5 is a cross section illustrating an alternative embodiment of a press system utilizing an outer support ring.
Figure 6:
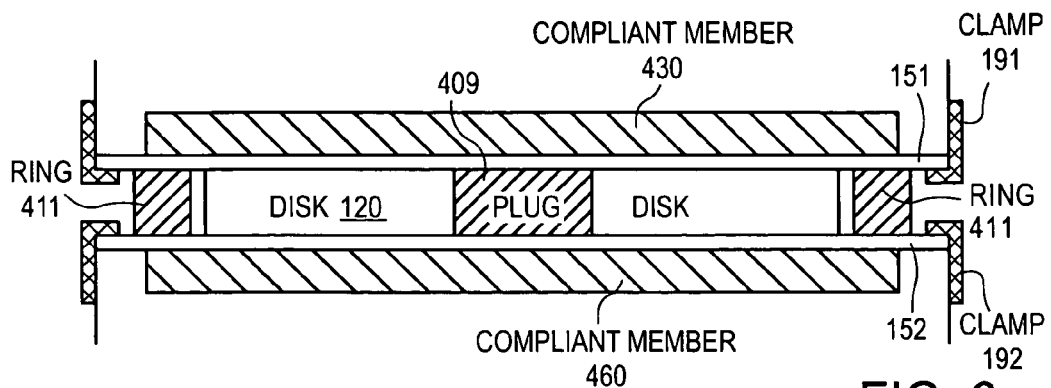
FIG. 6 is a cross section illustrating an alternative embodiment of a press system utilizing an outer support ring.
Figure 7:
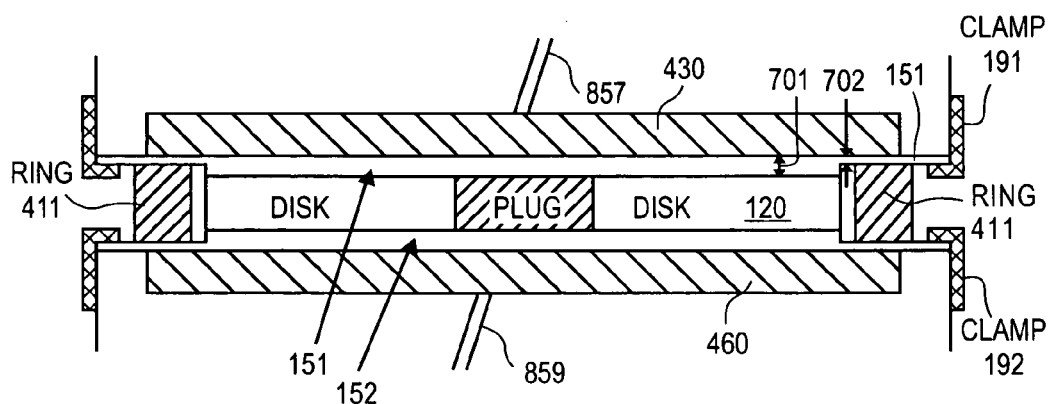
FIG. 7 is a cross section illustrating one embodiment of a press system utilizing fluid pressure on a membrane.

In the particular embodiments of FIGS. 5 and 7, compliant members 430 and 460 are membranes that extend beyond the outer diameter of disk 120. In addition, the press system of FIGS. 5 and 7, utilizes an OD ring 411 surrounding disk 120 that may be used to prevent collapse of the stampers 151 and 152 outside the diameter of disk 120 and insure uniform pressing out to the outer diameter of the disk 120. That is, without OD ring 411, stampers 151 and 152 may not maintain a uniform distance from each other throughout a diameter of disk 120, particularly near its outer diameter. This may result in inconsistent patterning near the outer diameter portions of disk 120 relative to other portions of disk 120. Similarly, the press system of FIG. 6 utilizes an OD ring 411 surrounding disk 120 that may be used to prevent collapse of the stampers 151 and 152 outside the diameter of disk 120 and insure uniform pressing out to the outer diameter of the disk 120 due to the use compliant members 430 and 460 having diameters greater than the diameter of disk 120. In the embodiments where OD ring 411 is used, such a ring may be configured with slots through which actuator arms 190 and 193 traverse in order to engage the outer sides of disk 120. In one embodiment, OD ring 411 is constructed from a solid material (e.g., NIP clad aluminum, glass). In an alternative embodiment, OD ring 411 may be constructed from a compliant material e.g., similar to the material used for compliant members 430 and 460.

FIG. 7 is a cross section illustrating one embodiment of a press system utilizing fluid pressure on a membrane. In this embodiment, stampers 151 and 152 having different thickness across their diameters. In particular, for example, the thickness 702 of stamper 151 along its outer diameter is less than its thickness 701 along its central diameter areas. The thickness 701 along the central diameter area of stamper 151 is selected to enable the generation of a patterned feature in the stamper while the outer diameter of stamper 151 is constructed thinner in order to facilitate clamping of the stamper 151 in upper die 110 using clamp 191. Stamper 152 and lower die 112 are similar configured. Alternatively, other configurations may be used to couple stampers 151 and 152 in their respective dies, for example, as discussed in relation to FIG. 8.

Referring still to FIG. 7, in this embodiment, the compliant members are membranes 430 and 460 sealed in their respective dies, forming a cavity therein. The cavity may be hermetically sealed relative to external ambient pressure. The press system also includes valve-controlled fluid inlets/outlets 857 and 859 for the introduction and removal of a pressurized fluid into a cavity behind membrane compliant members 430 and 460. The introduction of pressurized fluid in the cavities presses against the corresponding flexible membranes 430, 460 that, in turn, presses a corresponding stamper 151, 152 into disk 120. The pressurized fluid may be gas or liquid. The fluid may be heated and/or cooled in order to heat and/or cool, respectively, an embossable film residing on disk 120. The fluid may be pressurized, for example, in an approximate range of about 10 to about 5000 psi.

Figure 8:
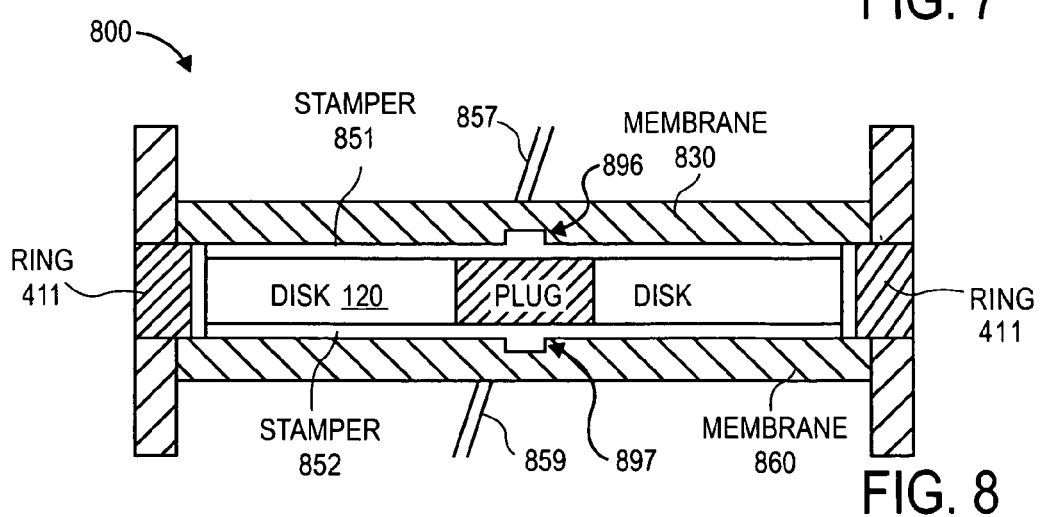
FIG. 8 is cross section illustrating an alternative embodiment of securing a stamper within a die.

FIG. 8 is cross section illustrating an alternative embodiment of securing a stamper within a die. In this embodiment, hole-less stampers 851 and 852 each have protrusions to interlock with corresponding recesses (896 and 897) in membranes 830 and 860, respectively, thereby eliminating the need for clamps 191 and 192 to secure the stampers in dies 110 and 112, respectively. In another embodiments, other coupling mechanisms may be used to secure a stamper in a die assembly. The membranes 830 and 860 are hermetically sealed in their respective dies, forming cavities therein for the introduction of a pressurize fluid, as discussed above with respect to FIG. 7.

Figure 9:
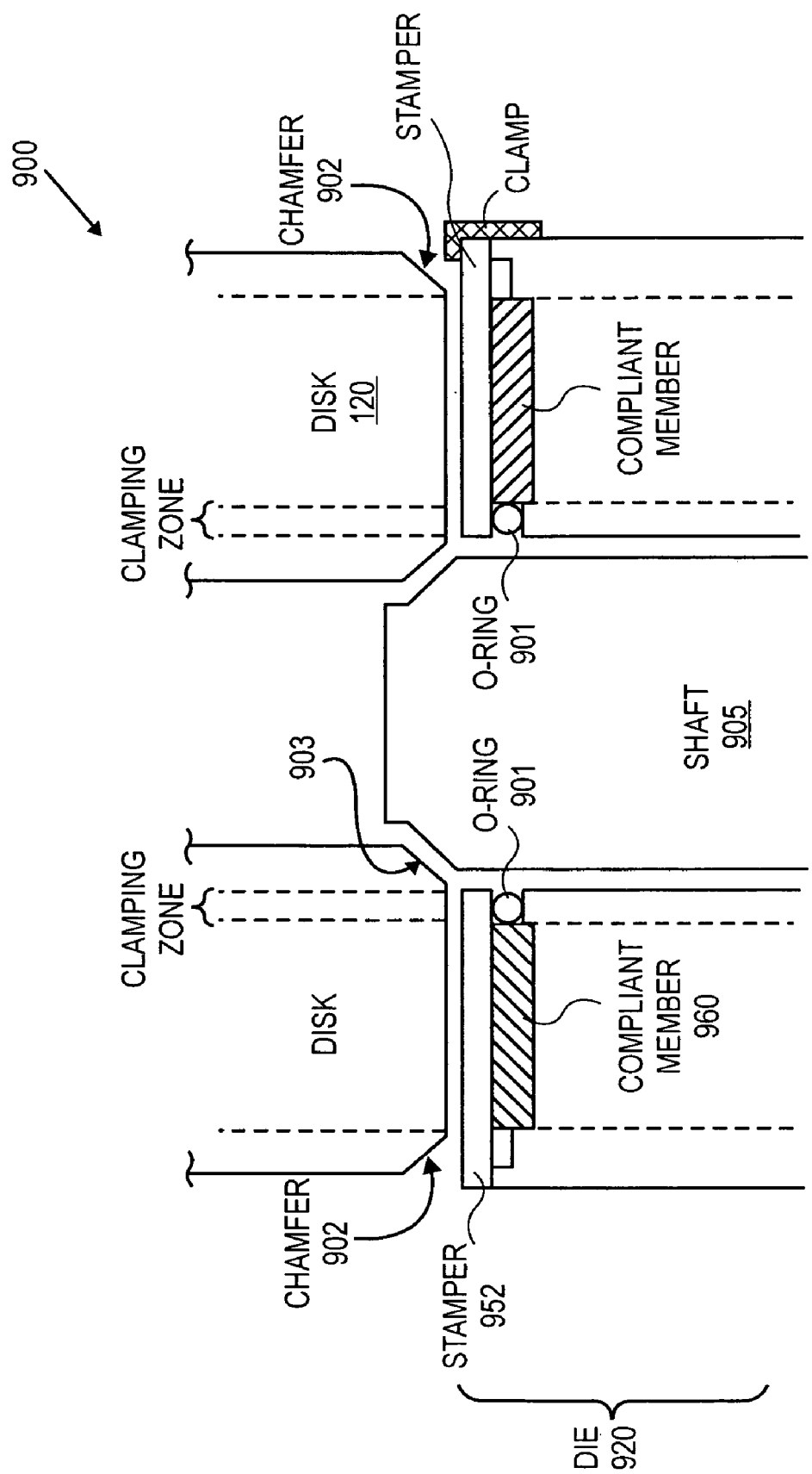
FIG. 9 is a cross section illustrating an alternative embodiment of a press system.

FIG. 9 is a cross section illustrating an alternative embodiment of a press system. In this embodiment, the press system 900 has a shaft 905 that is used to secure disk 120. The press system 900 also includes a compliant member 960 sealed within a die using an O-ring 901. In this embodiment, die 920 includes an annular stamper 952, and an annular compliant member 960 that is sealed within die 920 using O-ring 901. Sealing compliant member 960 with O-ring 901 may prevent the escape of particulates from the complaint member 960 toward disk 120 or other critical press system components that may contaminate disk 120 and/or stamper 952. It should be noted that the O-ring does not maintain a pressure of the stamper or compliant member but is primarily used as a contamination control barrier.

In this embodiment, annular stamper 952 is constructed with a cavity at its approximate center. The cavity is large enough to accommodate the diameter of shaft 905. A precision punch mechanism may be used to generate the cavity and/or to form the annular stamper out of a sheet of stamper material. Alternatively, annular stamper 952 may be formed using other techniques, for example, electroforming.

It should also be noted that the annulus of the complaint member does not have to be the same as the annulus of the disk 120. For example, as illustrated in FIG. 9, the annulus of compliant member 960 is less than the annulus of disk 120 and does not extend to the chamfer edges (902 and 903) of disk 120 or the clamping zone of disk 120.

In the illustrated embodiment of FIG. 9, only a single side of disk 120 and lower die 920 is illustrated for ease and clarity of describing press system 900. Press system 900 may also include an upper die assembly (not shown) for simultaneous pressing of both sides of disk 120. The upper die assembly may be similar to those discussed above with respect to FIGS. 1 and 4-8 (e.g., 110). It should also be noted that the press systems discussed herein need not be configured for dual side pressing but, rather, may be configured with only a single die for single sided pressing.

FIG. 10 is a cross section illustrating yet another embodiment of a press system. In this embodiment, press system 100 includes annular pistons 1010 and 1020 that are used to apply pressure P to annular compliant members 130 and 160 only on the surface areas of the compliant members. The annular pistons have an annulus dimension approximately the same as that of the annular compliant members. In such a configuration, pressure is not directly applied on the central regions of stampers 151 and 152. In this embodiment, compliant members 130 and 160 are constrained from displacing outwardly when pressed against stampers 151 and 152 by solid material areas 1011 and 1012, respectively. The solid material around the compliant members prevents outflow of the complaint members that may cause indeterminate grading of pressure at their outer diameters.

The upper die 110 is illustrated with a hole-less stamper 151. Lower die 112 is illustrated with an annular stamper 152 to allow for a retractable shaft 1005 to receive disk 120 from an infeed/outfeed mechanism. An o-ring 901 may be use in lower die 112 in manner similar to that discussed above with respect to FIG. 9. Alternatively, other die configurations may be used such that upper die 110 utilizes an annular stamper and lower die 112 utilizes a hole-less stamper.

In one embodiment, the press systems discussed above provide the ability to service die assemblies off-line. More specifically, one or both of the upper and lower dies 110 and 112 may be detachably coupled to thrust mechanisms (e.g., a thrust pad) in the press system such that they can be removed, for example, to service (e.g., replace) components such as the stampers (e.g., 151, 152) and compliant members (e.g., 130, 160).

The above embodiments have been described with exemplary reference to a "disk" substrate only for ease of discussion. It should be noted that other types and shapes of substrates may be used (e.g., wafer and panel oxide/substrates) having an embossable material disposed thereon. The apparatus and methods discussed herein may be used in applications such as the production of semiconductor devices and liquid crystal display panels. For example, the imprinting apparatus and methods discussed herein may be used to fabricate semiconductor devices (e.g., a transistor). In such a fabrication, an embossable material may be disposed above a base structure of, for example, an oxide (e.g., $SiO_2$) layer on top of a silicon wafer substrate. A stamper may be generated with a patterned structure for active areas of the transistor. The stamper is imprinted into the embossable material with the embossed pattern transferred into the oxide layer using etching techniques (e.g., reactive ion etching). Subsequent semiconductor wafer fabrication techniques well known in the art are used to produce the transistor.

In an alternative embodiment, for example, the imprinting apparatus and methods discussed herein may be used to fabricate pixel arrays for flat panel displays. In such a fabrication, an embossable material may be disposed above a base structure of, for example, an indium tin oxide (ITO) layer on top of a substrate. The stamper is generated with a patterned layer being an inverse of the pixel array pattern. The stamper is imprinted into the embossable material with the embossed pattern transferred into the ITO using etching techniques to pattern the ITO layer. As a result, each pixel of the array is separated by an absence of ITO material (removed by the etching) on the otherwise continuous ITO anode. Subsequent fabrication techniques well known in the art are used to produce the pixel array.

In yet another embodiment, as another example, the imprinting apparatus and methods discussed herein may be used to fabricate lasers. In such a fabrication, embossable material areas patterned by the stamper are used as a mask to define laser cavities for light emitting materials. Subsequent fabrication techniques well known in the art are used to produce the laser. In yet other embodiments, the apparatus and methods discussed herein may be used in other applications, for example, the production of multiple layer electronic packaging, the production of optical communication devices, and contact/transfer printing.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A die, comprising:
    a stamper; and
    a compliant member coupled with the stamper, the compliant member sealed within the die, wherein the compliant member is annular having a cavity to receive a shaft and wherein the compliant member is sealed within the die using an o-ring seal.

2. A die, comprising:
    a stamper; and
    a compliant member coupled with the stamper, the compliant member sealed within the die, wherein the die further comprises a constraint member coupled to the compliant member, and wherein the compliant member is sealed between the constraint member and the stamper.

3. The die of claim 2, wherein the compliant member is annular having a cavity at approximately its center and wherein the constraint member is coupled to the compliant member forming a gap, at the approximate center of the compliant member, between the constraint member and the stamper.

4. The die of claim 3, further comprising a pressurized gas disposed in the gap.

5. The die of claim 3, further comprising a plug disposed in the gap.

6. The die of claim 5, wherein the plug is constructed from an elastomer material.

7. The die of claim 5, wherein the plug is constructed from a solid material.

8. The die of claim 2, wherein the compliant member has a first outer diameter being less than a second outer diameter of the stamper.

9. The die of claim 2, wherein the compliant member comprises a membrane.

10. The die of claim 2, further comprising a clamp coupled to the stamper and a die piece, wherein the clamp comprises a leg having a thickness being configured to fit between a pair of the die in a closed position.

11. The die of claim 2, further comprising a clamp coupled to the stamper and a die piece, wherein the clamp comprises a leg having a thickness being greater than a combined thickness of the stamper and a disk to be disposed between a pair of the die.

12. A die comprising:
    a stamper:
    a compliant member coupled with the stamper, the compliant member sealed within the die; and
    a clamp coupled to the stamper and a die piece, wherein the clamp comprises a leg having a thickness being greater than a combined thickness of the stamper and a disk to be disposed between a pair of the die, wherein the die further comprises a chuck having a cavity, wherein a first end of the leg is disposed within the cavity and a second end of the leg extends beyond a surface of the stamper.

13. The die of claim 12, wherein the stamper is ductile.

14. The die of claim 13, further comprising a local edge deformation of the stamper at a point of coupling between the stamper and the clamp.

15. The die of claim 14, wherein the local edge deformation has a depth extending into the cavity and being greater than the thickness of the stamper.

16. The die of claim 2, wherein the stamper is thinner along an outer diameter area than at a central diameter area.

17. A press system, comprising:
    a upper die and a lower die, each of the upper and lower dies comprising:
        a stamper; and
        a compliant member coupled with the stamper, the compliant member sealed within a corresponding die;
    an actuator arm configured to engage a side of a disk to be disposed between the upper and lower dies; and
    a ring disposed around an outer diameter of the disk and between the upper and lower dies, wherein the ring has a slot configured to receive the actuator arm.

18. The press system of claim 17, wherein the ring has an outer diameter being substantially equal to an outer diameter of the stamper.

19. The press system of claim 17, wherein the stamper has an outer diameter being greater than an outer diameter of the disk.

20. The press system of claim 17, wherein the compliant member has an outer diameter being less than an outer diameter of the disk.

21. The press system of claim 17, wherein the compliant member has an inner diameter being greater than an inner diameter of the disk.

22. The press system of claim 17, wherein each of the upper and lower dies is detachably coupled with a corresponding thrust mechanism.

23. The press system of claim 17, further comprising a piezo actuator coupled to the actuator arm.

24. The press system of claim 17, wherein each of the upper and lower dies further comprises a clamp coupled to the stamper and a die piece, wherein the clamp comprises a leg having a thickness configured to fit between the upper and lower dies in a closed position.

25. A press system, comprising:
a upper die and a lower die, each of the upper and lower dies comprising:
a stamper, and
a compliant member coupled with the stamper, the compliant member sealed within a corresponding die; and
an actuator arm configured to engage a side of a disk to be disposed between the upper and lower dies, wherein each of the upper and lower dies further comprises a clamp coupled to the stamper and a die piece, wherein the clamp comprises a leg having a thickness configured to fit between the upper and lower dies in a closed position, wherein each of the upper and lower dies further comprises a chuck having a cavity, wherein a first end of the leg is disposed within the cavity and a second end of the leg extends beyond a surface of the stamper.

26. The press system of claim 25, wherein the stamper is ductile.

27. The press system of claim 26, further comprising a local edge deformation of the stamper at a point of coupling between the stamper and the clamp.

28. The press system of claim 27, wherein the local edge deformation has a depth extending into the cavity and being greater than the thickness of the stamper.

29. A press system, comprising:
a upper die and a lower die, each of the upper and lower dies comprising:
a stamper; and
a compliant member coupled with the stamper, the compliant member sealed within a corresponding die; and
an actuator arm configured to engage a side of a disk to be disposed between the upper and lower dies, wherein the compliant member is annular and wherein the press system further comprises an annular piston having an annulus approximately the same as an annulus of the compliant member.

30. The press system of claim 29, wherein each of the upper and lower dies further comprises a chuck constructed of a solid material, wherein the compliant member and the piston are disposed within the chuck and wherein the compliant member is constrained, by the solid material of the chuck, from displacing outwardly when pressed against the stamper by the annular piston.

31. The press system of claim 17, further comprising a retractable shaft to engage an inner diameter edge of the disk.

32. The press system of claim 31, further comprising an infeed/outfeed mechanism to load the disk on the retractable shaft.

33. An apparatus, comprising:
means for sealing compliant members within a upper die and a lower die;
means for aligning the upper and lower dies with respect to each other; and
means for aligning a disk with at least one of the upper and lower dies without the use of a mandrel disposed through a cavity of the disk.

34. The apparatus of claim 33, further comprising means for clamping a first stamper in the upper die and a second stamper in the lower die.

35. The apparatus of claim 34, further comprising means for constraining a first compliant member, within the upper die, from displacing outwardly when pressed against the first stamper.

36. A method, comprising:
providing a die having a compliant member, a stamper, and a constraint member; and
sealing a compliant member within the die, wherein sealing comprises disposing the compliant member between the stamper and the constraint member.

37. The method of claim 36, wherein sealing comprises sealing the compliant member within the die using an O-ring.

38. A method, comprising:
providing a die having a compliant member, a stamper, and a constraint member; and
sealing a compliant member within the die, wherein the compliant member is annular having a cavity at approximately its center and wherein the constraint member is coupled to the compliant member forming a gap, at the approximate center of the compliant member, between the constraint member and the stamper.

39. The method of claim 38, further comprising disposing a pressurized gas within the gap.

40. The method of claim 38, further comprising disposing a plug within the gap.

41. A method, comprising:
providing a die having a compliant member, a stamper, and a constraint member;
sealing a compliant member within the die;
centering a disk near the die; and
stamping an embossable layer disposed above a base structure of the disk.

42. The method of claim 41, wherein the stamper is ductile and wherein sealing comprises clamping the stamper to a die piece using a clamp having a leg with a thickness being less than a thickness of the stamper.

43. A method, comprising:
providing a die having a compliant member, a stamper, and a constraint member; and
sealing a compliant member within the die, wherein the compliant member is annular and wherein sealing comprises disposing the compliant within a solid material with a side constrained by the solid material, a first annular surface constrained by the stamper and a second annular surface constrained by the constraint member, wherein the constraint member is an annular piston.

* * * * *